United States Patent
Dawson et al.

(10) Patent No.: US 11,909,703 B2
(45) Date of Patent: Feb. 20, 2024

(54) LIVE CHAT STREAM COMMENT MANAGEMENT

(71) Applicant: International Business Machines Corporation, Armonk, NY (US)

(72) Inventors: Emma Jane Dawson, Eastleigh (GB); Gwilym Benjamin Lee Newton, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 17/412,430

(22) Filed: Aug. 26, 2021

(65) Prior Publication Data
US 2023/0067819 A1    Mar. 2, 2023

(51) Int. Cl.
| | |
|---|---|
| *H04L 51/212* | (2022.01) |
| *H04L 51/046* | (2022.01) |
| *H04L 12/18* | (2006.01) |
| *G06F 40/35* | (2020.01) |
| *H04L 65/401* | (2022.01) |

(52) U.S. Cl.
CPC ............ *H04L 51/212* (2022.05); *G06F 40/35* (2020.01); *H04L 12/1831* (2013.01); *H04L 51/046* (2013.01); *H04L 65/4015* (2013.01)

(58) Field of Classification Search
CPC . H04L 51/212; H04L 12/1831; H04L 51/046; H04L 65/4015; G06F 40/35
See application file for complete search history.

(56) References Cited

U.S. PATENT DOCUMENTS

| | | | |
|---|---|---|---|
| 7,870,209 B2 | 1/2011 | Brochu et al. | |
| 9,230,541 B2 | 1/2016 | Ll | |
| 9,804,752 B1 | 10/2017 | Mall | |
| 10,841,261 B2 | 11/2020 | Katis et al. | |
| 2015/0095032 A1 | 4/2015 | Li | |
| 2016/0132812 A1 | 5/2016 | Beasley et al. | |
| 2018/0359530 A1* | 12/2018 | Marlow | G11B 27/031 |
| 2020/0044996 A1* | 2/2020 | Johnson | H04L 51/046 |
| 2020/0177529 A1* | 6/2020 | Trim | H04L 12/1822 |
| 2022/0277403 A1* | 9/2022 | Warden | G06Q 50/01 |
| 2022/0377035 A1* | 11/2022 | Shapiro | H04L 51/063 |

OTHER PUBLICATIONS

"Natural Language Understanding," Watson, Printed Aug. 10, 2021, 2 pages https://natural-language-understanding-demo.ng.bluemix.net/.

(Continued)

*Primary Examiner* — Clayton R Williams
*Assistant Examiner* — Tania M Pena-Santana
(74) *Attorney, Agent, or Firm* — Nathan M. Rau

(57) ABSTRACT

Embodiments of the present invention provide systems and methods for processing comments provided to a live chat stream. By way of example, embodiments obviate or mitigate problems associated with conventional live chat streams by assessing semantic uniqueness of collections of comments in a live chat stream and then determining a final importance score for each collection based on its semantic-uniqueness and activity score. The display of each collection can then be controlled based on its final importance score.

20 Claims, 5 Drawing Sheets

(56) References Cited

OTHER PUBLICATIONS

"IBM Watson Natural Language Understanding Text Analysis," IBM, Printed Aug. 10, 2021, 1 page https://www.ibm.com/demos/live/natural-language-understanding/self-service/home.

"Text Similarity: estimate the degree of similarity between two texts.," Dandelion API, Printed Aug. 10, 2021, 2 pages, https://dandelion.eu/semantic-text/text-similarity-demo/?.

"Concept mining," Wikipedia, The Free Encyclopedia, Printed Aug. 10, 2021, 2 pages https://en.wikipedia.org/wiki/Concept_mining.

"Levenshtein distance," Wikipedia, The Free Encyclopedia, Printed Aug. 10, 2021, 8 pages https://en.wikipedia.org/wiki/Levenshtein_distance.

"Semantic similarity," Wikipedia, The Free Encyclopedia, Printed Aug. 10, 2021, 12 pages https://en.wikipedia.org/wiki/Semantic_similarity.

"K-means clustering," Wikipedia, The Free Encyclopedia, Printed Aug. 10, 2021, 17 pages https://en.wikipedia.org/wiki/K-means_clustering.

"Exponential decay," Wikipedia, The Free Encyclopedia, Printed Aug. 10, 2021, 8 pages https://en.wikipedia.org/wiki/Exponential_decay.

"Keyword extraction," Wikipedia, The Free Encyclopedia, Printed Aug. 10, 2021, 2 pages https://en.wikipedia.org/wiki/Keyword_extraction.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

LIVE CHAT STREAM COMMENT MANAGEMENT

BACKGROUND

The technical character of the present invention generally relates to the field of real-time or near real-time messaging (commonly referred to as live chat streams), and more particularly, systems and methods for processing comments provided to a live chat stream.

Internet-based chat systems provide a way for online users to engage in real-time (i.e. 'live') conversations (or 'chats'). Typically, these systems provide for real-time group textual messaging with a community conversation forum, chat room or "live chat stream" displayed as a stream of comments in a graphical user interface (GUI) implemented in a distributed computing environment. Live chat streams enable real-time communications on various topics by two or more participants of similar or divergent interests or backgrounds.

The number and frequency of comments received in a live chat stream can vary (e.g. depending on the subject matter associated with the live chat and the number of participants engaged in the live chat). In some instances, where a live chat session involves many participants, it can be challenging for participants to have a coherent conversation with one another due to the high rate of comments being added to the chat in a short amount of time. For example, when new comments are arriving to the live chat at high rate, a user might not even have enough time to read a comment added to the chat before further new comments have pushed it out of the display area. For instance, a single comment added to a busy live chat stream may be displayed for less than a second (and therefore easily missed by one or more participants of the live chat stream). It follows that conversations in live chat streams can become chaotic and/or break down quickly.

SUMMARY

Some embodiments of the present disclosure can be illustrated as a method. The method includes receiving new comments provided to a current session of a live chat stream. The method further includes analyzing content of the new comments. The method further includes, for each of the new comments, adding, based on the analyzing, the new comment to one or more of a plurality of collections of comments. The method further includes identifying active collections of the plurality of collections, active collections including at least one new comment. The method further includes calculating, for each active collection, a first measure of semantic similarity between the collection and the remaining active collections of the live chat stream. The method further includes calculating, for each active collection, a second measure of semantic similarity between the active collection and non-active collections of the live chat stream. The method further includes calculating, for each active collection, a third measure of semantic similarity between the active collection and historical collections of comments for one or more prior sessions of the live chat stream. The method further includes determining, for each active collection, a semantic-uniqueness score based on the first, second and third measures of semantic similarity. The method further includes determining, for each active collection, an activity score representing an activity level of the active collection for the current session of the live chat stream. The method further includes determining, for each active collection, a final importance score based on its semantic-uniqueness score and activity score. The method further includes controlling the display of each active collection based on its final importance score.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may be configured to execute instructions to perform the method discussed above.

The above summary is not intended to describe each illustrated embodiment or every implementation of the present disclosure.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention. The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
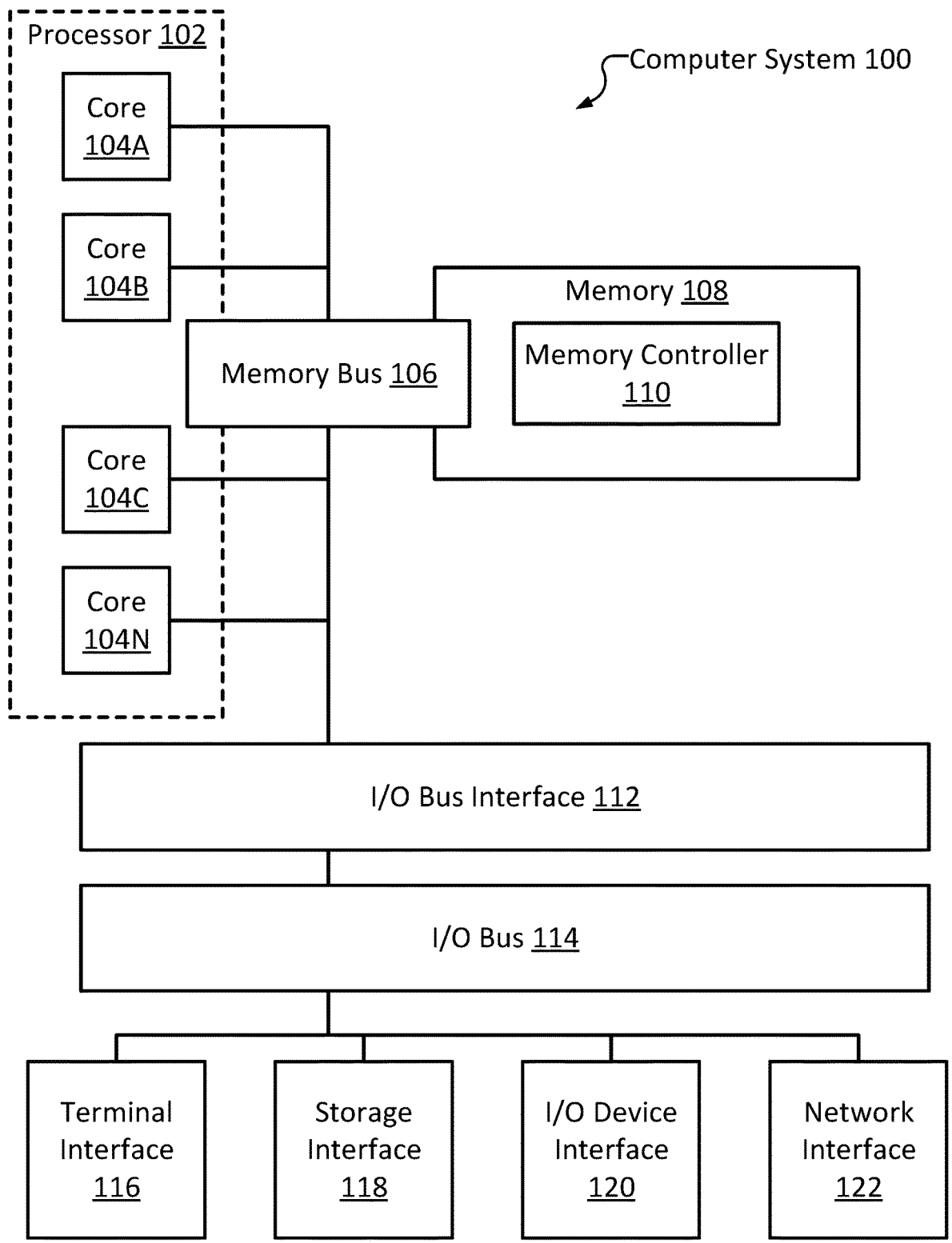
FIG. 1 illustrates a high-level block diagram of an example computer system that may be used in implementing embodiments of the present disclosure.

While the disclosure is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer i.e., the method is a computer-implementable method. The various steps of the method therefore reflect various parts of a computer program, e.g., various parts of one or more algorithms.

Also, in the context of the present application, a (processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Also, in the context of the present application, a system may be a single device or a collection of distributed devices that are adapted to execute one or more embodiments of the methods of the present invention. For instance, a system may be a personal computer (PC), a portable computing device (such as a tablet computer, laptop, smartphone, etc.), a set-top box, a server or a collection of PCs and/or servers connected via a network such as a local area network, the Internet and so on to cooperatively execute at least one embodiment of the methods of the present invention.

The technical character of the present invention generally relates to real-time messaging/discussion sessions (otherwise referred to as 'live chat streams'), and more particularly, to concepts for processing and/or controlling the display of comments provided to a live chat stream. Such concepts may, for example, improve overall quality of a live chat stream (e.g. by removing 'noise' from the live chat).

By way of example, embodiments of the present invention provide a concept for controlling the display of comments in a live chat stream, based on a determined importance of collections of comments. Through the calculation of a 'final importance score' for collections of comments, and subsequent comparison/assessment of the score against a threshold value, for example, embodiments may be adapted to decide whether the display of comments in the live chat requires alteration.

Embodiments may employ concepts that determine various measures of sematic similarity between collections of comments. Based on these semantic similarities and activity within a current session of a live stream, importance of collections of comments (e.g. comment of the same topic, type or subject-matter) may be identified. Through the identification of an importance of a collection of comments, the display of such comments in the live chat stream may be controlled to ensure that only important (e.g. relevant or useful) comments are displayed in the live chat stream.

Embodiments may therefore obviate or mitigate problems associated with conventional live chat streams, by providing a method, a system and a computer program product for processing comments provided to a live chat stream. Embodiments may thus be implemented in cloud computing environment or a distributed communications network.

The proposed concept(s) may achieve such benefits through the use of techniques for detecting concepts and keywords in text and/or approaches/techniques for determining semantic similarity.

A proposed embodiment provides a computer-implemented method for processing comments provided to a live chat stream. The live chat stream may have collections of comments, wherein a collection of comments consists of comments including similar content (i.e. comments relating to the same topic or including the same keyword). For instance, a first collection of comments may consist of comments relating to the same topic or concept. A second collection of comment may consist of comments containing a particular keyword. Thus, a collection of comments may be considered to be a group of comments having the same predetermined property or characteristics. Also, a collection may be thought of as being 'active' if it includes comments from a currently live chat stream session.

The method comprises: analyzing content of new comments provided to a current session of a live chat stream; for each of the new comments, adding the new comment to one or more of the collections of comments based on a result of the analysis; for each active collection of comments for the live chat stream, calculating a first measure of semantic similarity between the active collection and the remaining active collections of the live chat stream; for each active collection, calculating a second measure of semantic similarity between the active collection and non-active collections of the live chat stream; for each active collection, calculating a third measure of semantic similarity between the active collection and historical collections of comments for one or more prior sessions of the live chat stream; for each active collection, determining a semantic-uniqueness score based on its first, second and third measures of semantic similarity; for each active collection, determining an activity score representing an activity level of the active collection for the current session of the live chat stream; determining a final importance score for each active collection based on its semantic-uniqueness and activity score; and controlling the display of each active collection based on its final importance score.

By way of example, determining a semantic-uniqueness score based on its first, second and third measures of semantic similarity may comprise applying weighting values to the first, second and third measures of semantic similarity.

The activity score may be determined based on a temporally decaying value. For instance, determining an activity score for an active collection may comprise: increasing a previous activity score for the active collection responsive to a new comment being added to the active collection; and decreasing a previous activity score for the active collection responsive to no new comment being added to the active collection.

In some embodiments, analyzing content of a new comment provided to the current session of the live chat stream may comprise identifying one or more concepts of the new comment; determining a distance of the new comment from the active collections of comments; and extracting one or more key words from the new comment. By way of example, identifying one or more concepts of the new comment may comprise processing the new comment with a concept mining algorithm. Also, determining a distance of the new comment from the active collections of comments may comprise calculating a Levenshtein distance of the new comment from each of the active collections of comments. Embodiments may therefore employ one or more known techniques for assessing similarity, thus leveraging known processes to reduce cost and/or complexity of implementation.

Also, analyzing content of the new comment provided to the current session of the live chat stream may further comprise, for each of the active collections of comments, calculating a similarity score of the new comment based: on the identified one or more concepts of the new comment; the determined distance of the new comment from the active collections of comments; and extracted one or more key words from the new comment. Yet further, adding the new comment to one or more of the collections of comments based on a result of the analysis may comprise, for each of the active collections of comments, adding the new comment to the active collection if the calculated similarity score of the new comment for the active collection exceeds a threshold value.

Referring now to FIG. 1, shown is a high-level block diagram of an example computer system 100 that may be configured to perform various aspects of the present disclosure, including, for example, method 500. The example computer system 100 may be used in implementing one or more of the methods or modules, and any related functions or operations, described herein (e.g., using one or more processor circuits or computer processors of the computer), in accordance with embodiments of the present disclosure. In some embodiments, the major components of the computer system 100 may comprise one or more CPUs 102, a memory subsystem 108, a terminal interface 116, a storage interface 118, an I/O (Input/Output) device interface 120, and a network interface 122, all of which may be communicatively coupled, directly or indirectly, for inter-component communication via a memory bus 106, an I/O bus 114, and an I/O bus interface unit 112.

The computer system 100 may contain one or more general-purpose programmable processors 102 (such as central processing units (CPUs)), some or all of which may include one or more cores 104A, 104B, 104C, and 104N, herein generically referred to as the CPU 102. In some embodiments, the computer system 100 may contain multiple processors typical of a relatively large system; however, in other embodiments the computer system 100 may alternatively be a single CPU system. Each CPU 102 may execute instructions stored in the memory subsystem 108 on a CPU core 104 and may comprise one or more levels of on-board cache.

In some embodiments, the memory subsystem 108 may comprise a random-access semiconductor memory, storage device, or storage medium (either volatile or non-volatile) for storing data and programs. In some embodiments, the memory subsystem 108 may represent the entire virtual memory of the computer system 100 and may also include the virtual memory of other computer systems coupled to the computer system 100 or connected via a network. The memory subsystem 108 may be conceptually a single monolithic entity, but, in some embodiments, the memory subsystem 108 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 108 may contain elements for control and flow of memory used by the CPU 102. This may include a memory controller 110.

Although the memory bus 106 is shown in FIG. 1 as a single bus structure providing a direct communication path among the CPU 102, the memory subsystem 108, and the I/O bus interface 112, the memory bus 106 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 112 and the I/O bus 114 are shown as single respective units, the computer system 100 may, in some embodiments, contain multiple I/O bus interface units 112, multiple I/O buses 114, or both. Further, while multiple I/O interface units are shown, which separate the I/O bus 114 from various communications paths running to the various I/O devices, in other embodiments some or all of the I/O devices may be connected directly to one or more system I/O buses.

In some embodiments, the computer system 100 may be a multi-user mainframe computer system, a single-user system, or a server computer or similar device that has little or no direct user interface but receives requests from other computer systems (clients). Further, in some embodiments, the computer system 100 may be implemented as a desktop computer, portable computer, laptop or notebook computer, tablet computer, pocket computer, telephone, smart phone, mobile device, or any other appropriate type of electronic device.

It is noted that FIG. 1 is intended to depict the representative major components of an exemplary computer system 100. In some embodiments, however, individual components may have greater or lesser complexity than as represented in FIG. 1, components other than or in addition to those shown in FIG. 1 may be present, and the number, type, and configuration of such components may vary.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
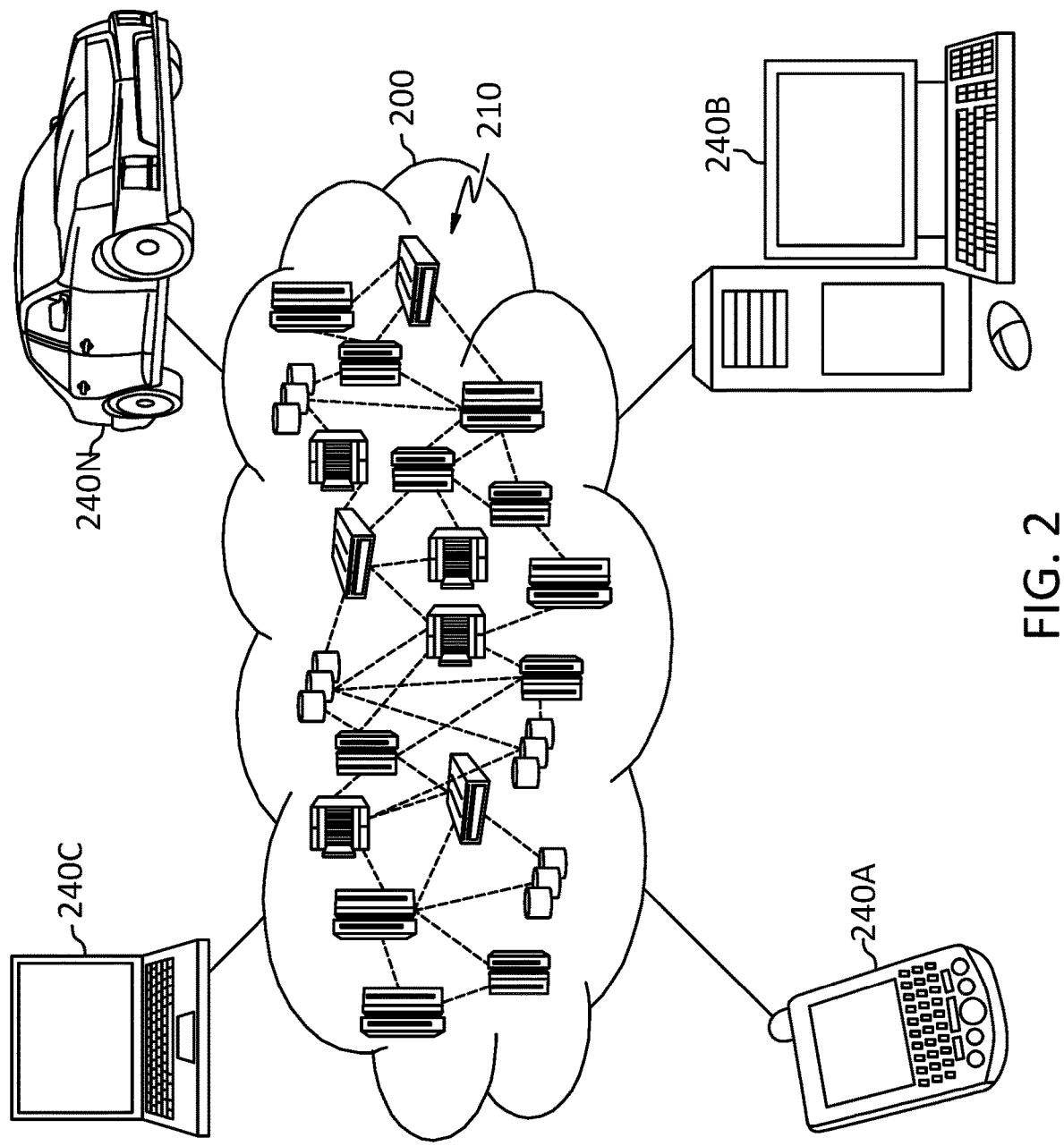
FIG. 2 depicts a cloud computing environment according to embodiments of the present invention.

Referring now to FIG. 2, illustrative cloud computing environment 200 is depicted. As shown, cloud computing environment 200 comprises one or more cloud computing nodes 210 with which local computing devices used by cloud consumers, such as, for example, personal digital assistant (PDA) or cellular telephone 240A, desktop computer 240B, laptop computer 240C, and/or automobile computer system 240N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 240A-N shown in FIG. 2 are intended to be illustrative only and that computing nodes 210 and cloud computing environment 200 can communicate with any type of computerized device over any type of network and/or network addressable connection (e.g., using a web browser).

Figure 3:
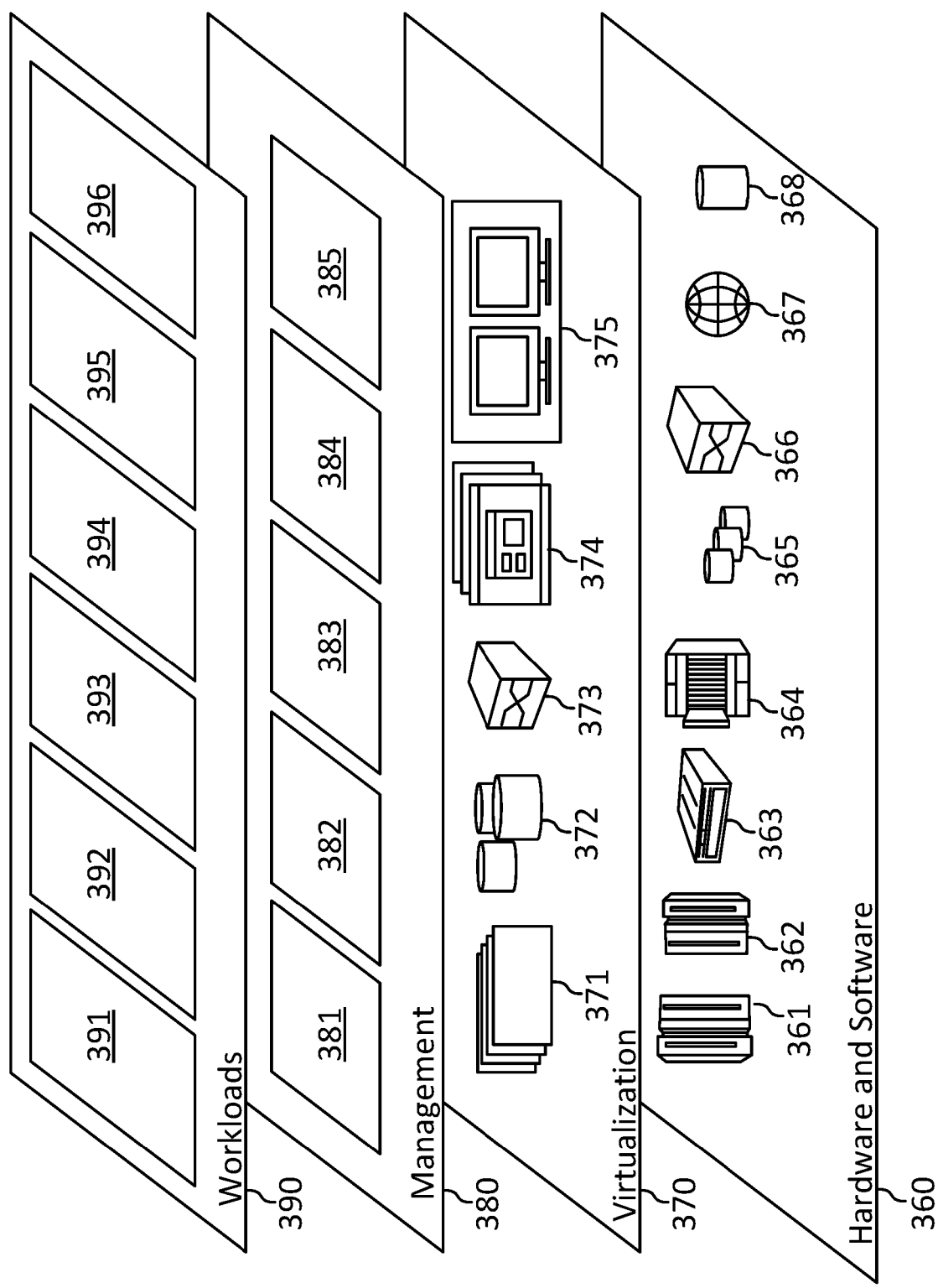
FIG. 3 depicts abstraction model layers according to embodiments of the present invention.

Referring now to FIG. 3, a set of functional abstraction layers provided by cloud computing environment 200 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and live chat stream comment processing 396.

Figure 4:
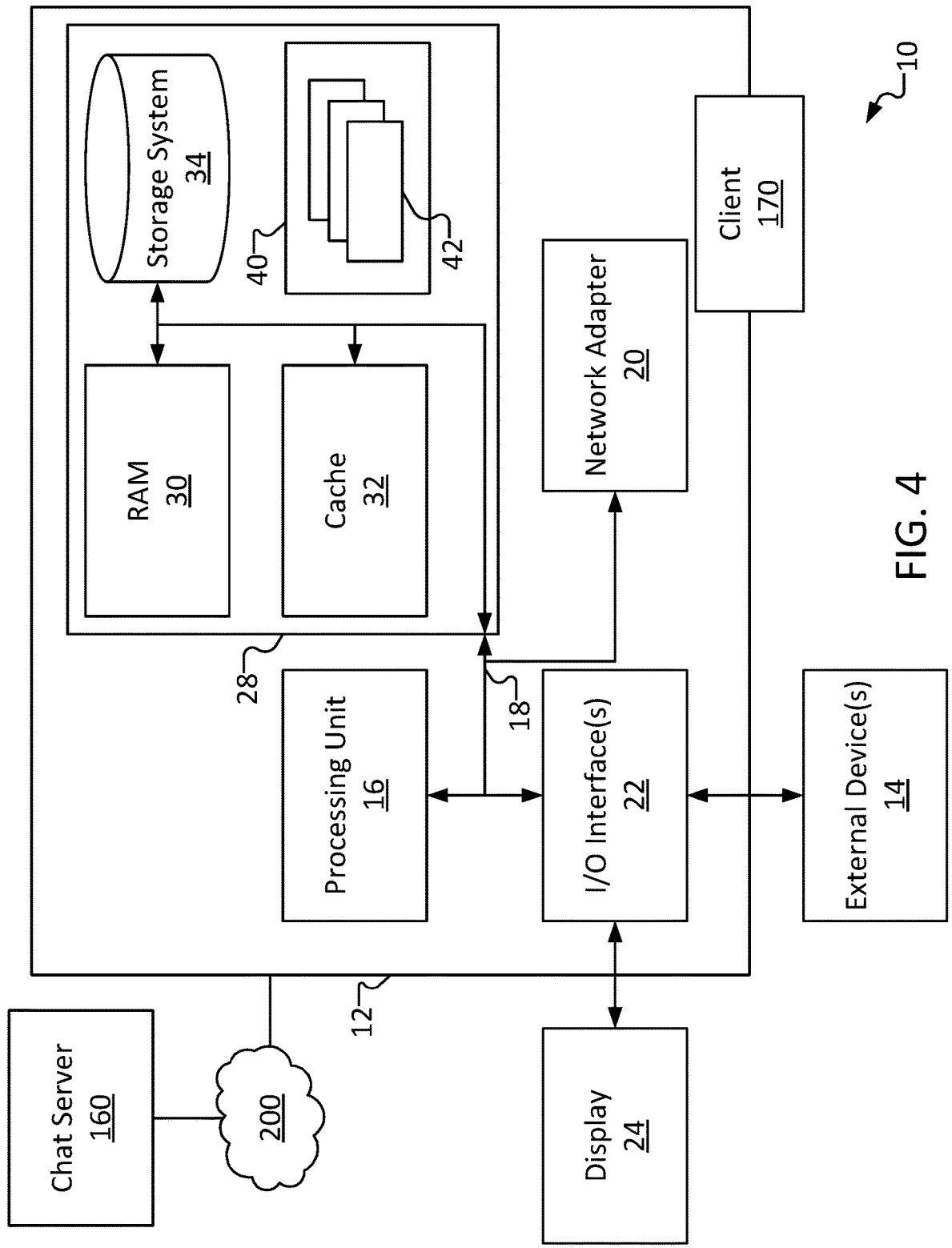
FIG. 4 depicts a cloud computing note according to another embodiment of the present invention.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment.

Program modules 42 generally carry out the functions and/or methodologies of embodiments of the invention as described herein. For example, some or all of the functions of a DHCP client 80 can be implemented as one or more of the program modules 42. Additionally, the DHCP client 80 may be implemented as separate dedicated processors or a single or several processors to provide the functionality described herein. In embodiments, the DHCP client 80 performs one or more of the processes described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

As shown in FIG. 4, the computer system/server 12 also comprises or communicates with a live chat stream client 170, and a chat server 160. In accordance with aspects of the invention, the live chat stream client 170 can be implemented as program code in program modules 42 stored in memory 28 as separate or combined modules. Additionally, the live chat stream client 170 may be implemented via separate dedicated processors or a single or several processors to provide the function of these tools. While executing the computer program code, the processing unit 16 can read and/or write data to/from memory, storage system, and/or I/O interface 22. The program code executes the processes of the invention.

By way of example, live chat stream client 170 may be configured to communicate with the chat server 160 via a cloud computing environment 200. As discussed with reference to FIG. 2, for example, cloud computing environment 200 may be the Internet, a local area network, a wide area network, and/or a wireless network. In embodiments of the proposed incident management mechanism, the chat server 160 may provision data to the live chat stream client 170. In some instances, live chat stream client 170 and chat server 160 may communicate directly. Alternatively, a relay agent may be used as an intermediary to relay comments between live chat stream client 170 and chat server via the cloud computing environment 200.

Figure 5:
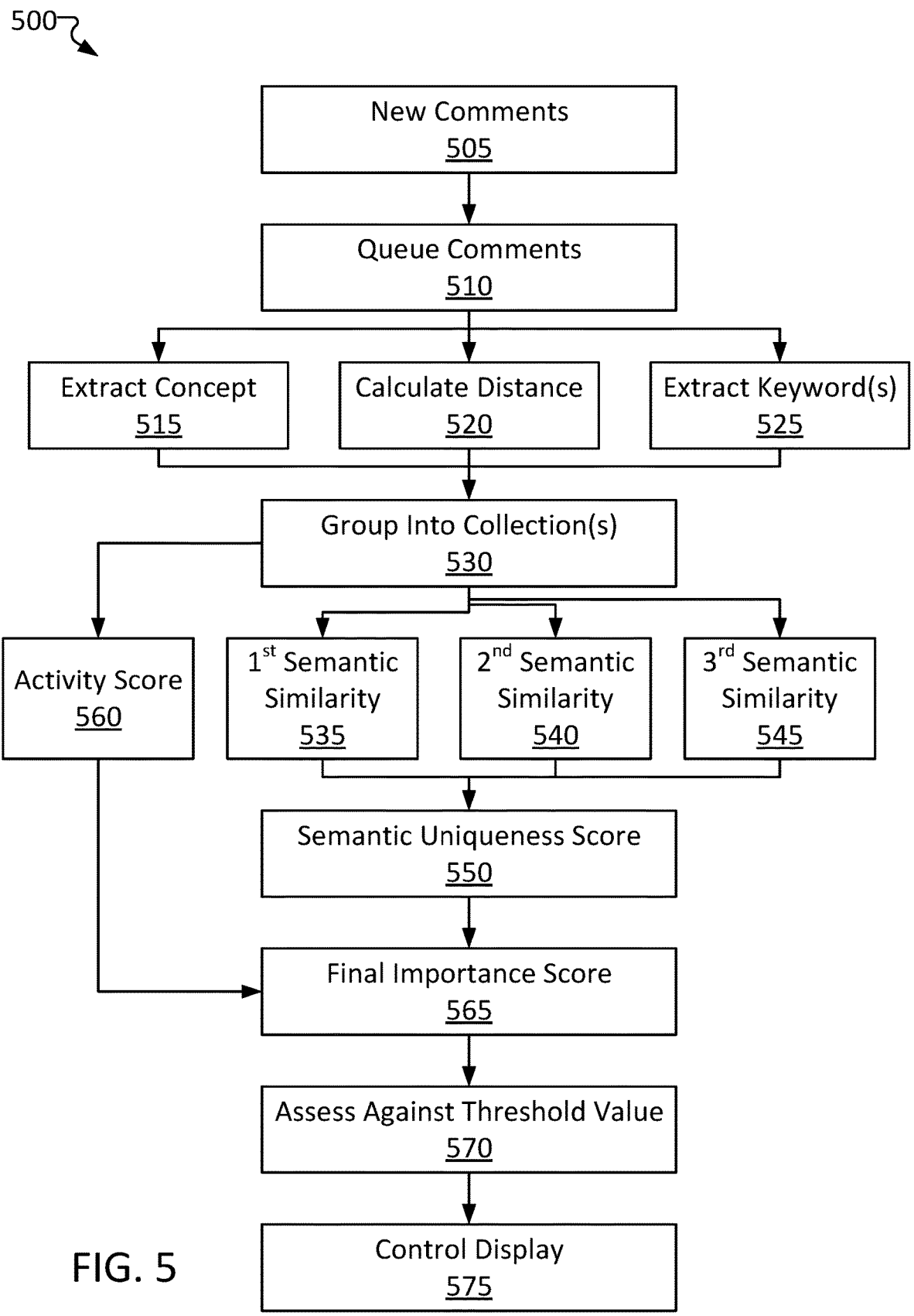
FIG. 5 is a method for live chat stream comment processing, according to several embodiments of the present disclosure.

FIG. 5 is a method 500 for live chat stream comment processing, according to several embodiments of the present disclosure. Method 500 may be implemented in the environment of FIGS. 1 and 4, for example.

Method 500 begins with step 505 of users providing new comments to a live chat stream. The new comments are then queued in step 510 for subsequent processing. The queued comments are then processed in steps 515, 520 and 525.

Specifically, in step 515 one or more concepts of the comment are extracted (i.e. identified). In particular, in this example embodiment, a concept extraction system (or concept mining algorithm) generates an array of concepts from a comment and attaches the extracted concept(s) to the comment as metadata.

In step 520, a distance of a new comment from active collections of comments of the live chat stream is calculated. By way of example, in step 520, fuzzy matching may be applied, and a Levenshtein distance may be calculated and compared against active collections of the live chat stream.

In step 525, one or more key words are extracted from the comment. For instance, basic key word extraction may be employed, wherein a keyword dictionary supplied at system setup is used.

Thus, it will be understood that steps 512, 520 and 525 are undertaken to analyze the content of the comments.

Based on the results of the analysis (from steps 515, 520 and 525), each of the new comments are added to one or more of the collections of comments in step 530. That is, the new comments are grouped/clustered into collections of comments. By way of example, the comments from multiple users are processed into collections using a weighted calculation of the data provided by analysis steps 515, 520 and 525. Such a calculation may, for example, consider how similar a new comment is to the chat lines in an existing collection of comments.

For instance, step 530 may comprise, for each of the active collections of comments, calculating a similarity score of the new comment based on: the identified one or more concepts of the new comment; the determined distance of the new comment from the active collections of comments; and extracted one or more key words from the new comment. The new comment can then be added to one or more of the collections of comments based on a result of the analysis. For instance, the new comment may be added to the active collection if the calculated similarity score of the new comment for the active collection exceeds a threshold value. If the calculated similarity score of the new comment exceeds the threshold value for multiple active collections, the new comment may be added to the active collection with which the new comment has the highest calculated similarity score. If the calculated similarity score of the new comment does not exceed the threshold value for any active collections, the new comment may be added to a new collection.

Next, the collections of comments are processed, in steps 535, 540 and 545.

Specifically, step 535 comprises, for each active collection of comments for the live chat stream, calculating a first measure of semantic similarity between the active collection and the remaining active collections of the live chat stream.

Step 540 comprises, for each active collection, calculating a second measure of semantic similarity between the active collection and non-active collections of the live chat stream. "Non-active" collections of the live chat stream include collections that may have been observed during the stream session but are not currently active, as opposed to "historical" collections which include collections that have been observed during previous stream sessions but not during a current session. As a clarifying example, during a first stream session, two collections may be observed, designated collection "A" and collection "B." The first stream session may then end (e.g., a streamer may end the stream for the day). The streamer may then later initiate a second stream session (e.g., the following day). A third collection "C" may be active during the first two hours of the second stream session, but may no longer be active by the third hour of the second stream session, while the first collection "A" may be active for the entirety of the second stream session. In such an instance, during the third hour of the second stream session, collection "A" is active, collection "C" is non-active, and collection "B" is historical.

collections ends, a second stream session may

Step 545 comprises, for each active collection, calculating a third measure of semantic similarity between the active collection and historical collections of comments for one or more prior sessions of the live chat stream.

Then, for each active collection, step 550 comprises determining a semantic-uniqueness score based on its first, second and third measures of semantic similarity (obtained from steps 535, 540 and 545, respectively). The purpose of this semantic-uniqueness score is to provide an estimate of whether the content of the comment(s) is interesting/relevant for the chat stream.

Step 560 comprises, for each active collection, determining an activity score representing an activity level of the active collection for the current session of the live chat stream. By way of example, the activity score may be determined based on a temporally decaying value. For instance, determining the activity score for an active collection (step 560) may comprise: increasing a previous activity score for the active collection responsive to a new comment being added to the active collection; and decreasing a previous activity score for the active collection responsive to no new comment being added to the active collection over a pre-determined period of time (e.g., 20 minutes, 1 hour, etc.). Thus, as comments are added to a collection, they add a value to the activity score. However, by decreasing this value over time, collections must be added to regularly/constantly in order to be kept alive. In this way, an activity score based on temporal decay can be employed. Also, the rate of decay may be adjusted to the live chat stream state (e.g., in a busy chat, it may be preferable to employ a fast rate of decay). That is, the decay rate may be a function of the throughput of the live chat stream.

In step 565, a final importance score for each active collection is determined based on its semantic-uniqueness and activity score (from steps 560 and 550). For example, this may be a weighed summing of both scores. In some embodiments, both scores may be normalized (e.g., to between 0 and 1) before summing. The weights may be static (e.g. set by an administrator) or dynamic. For instance, in a busier chat system, it may be preferable to bias toward the semantic uniqueness score.

Next, in step 570, the final importance score for each active collection is assessed (e.g., compared) against a predetermined threshold value. Based on the assessment results, the display of each active collection is controlled in step 575. For example, an active collection may be displayed if its final importance score exceeds the predetermined threshold value. The threshold value can be set by a user to provide an added level of control over a live chat. Furthermore, aspects/characteristics of display may be based on the final importance score. For example, a display size, and other "attention markers" (e.g. movement and/or bright colors) can be adjust based on the importance score of a collection.

By way of further example and explanation, an exemplary method of processing comments for a live chat stream of an online gaming session according to a proposed embodiment is described below.

To begin with, it is assumed that the system has the following three collections of comments already defined:

Collection "A" includes text: "You missed the key," an activity score of "1," concepts: ["The key"], and keywords: ["Key"].

Collection "B" includes text: "Love your content," an activity score of 0.6, concepts: [ ], and keywords: ["Content"].

Collection "C" includes text: "Why did we change game?", an activity score: 0.8, concepts: [ ], and keywords: ["Game"].

The following two comments (C1 & C2) may then be provided to the live chat steam (e.g., by one or more users):

C1) "I think you missed the key in the other room"
C2) "Have you tried playing 'Martian Hamster'"

The two comments are then processed to implement concept extraction, distance calculation and keyword extraction (i.e. steps 515, 520 and 525 of the method of FIG. 5). For example, step 515's "concept extraction" may be undertaken using conventional/known concept detection and extraction techniques. For C1, the extracted concept may be "The Key." For C2, no concept may be detected/extracted.

At step 520, "distance calculation" may include determining a Levenshtein distance to each collection. The Levenshtein distance may be normalised using, for example, LD/Sum(Chars)). For C1, the following Levenshtein distances may be determined:

(C1->A)-27(Normalised to 27/63)->0.42

(C1->B)-35(Normalised to 35/63)->0.55

(C1->C)-32(Normalised to 32/68)->0.47

For C2, the following Levenshtein distances are determined:

(C2->A)-25(Normalised to 25/50)->0.5

(C2->B)-21(Normalised to 21/49)->0.42

(C2->C)-23(Normalised to 23/)->0.38

At step 525, "keyword extraction" may be undertaken using conventional/known keyword detection techniques. For C1, the extracted keywords may be ["room", "key"]. For C2, the extracted keyword may be ["Hamster"].

The comments are then clustered into collections at step 530 of the method of FIG. 5. For this, between each comment and each collection, a similarity score S is calculated using equation (1), below:

$$S = W1*(C) + W2*(1-L) + W3*K \quad (1)$$

wherein, C is the number of shared concepts/max concepts, W1 is a first weighting value, L is the Levenshtein distance, W2 is a second weighting value, K is the number of shared Keywords/max keywords, and W3 is a third weighting value.

By way of example, assuming weighting values of W1=1 W2=0.75, and W3=0.5, the following similarity values are obtained:

For C1:

$$(C1 \rightarrow A) - 1*(1/1) + 0.75*(1-0.42) + 0.5*(1/2) = 1 + 0.425 + 0.25 = 1.675$$

$$(C1 \rightarrow B) - 1*(0/1) + 0.75*(1-.55) + 0.5*(0/3) = 0 + 0.3375 + 0 = 0.3375$$

$$(C1 \rightarrow C) - 1*(0/1) + 0.75*(1-0.47) + 0.5*(0/3) = 0 + 0.4725 + 0 = 0.4725$$

For C2:

$$(C2 \rightarrow A) - 1*(0/1) + 0.75*(1-0.5) + 0.5*(0/2) = 0 + 0.375 + 0 = 0.375$$

$$(C2 \rightarrow B) - 1*(0/0) + 0.75*(1-0.42) + 0.5*(0/2) = 0 + 0.435 + 0 = 0.435$$

$$(C2 \rightarrow C) - 1*(0/0) + 0.75*(1-.38) + 0.5*(0/2) = 0 + 0.465 + 0 = 0.465$$

The scores may then be compared against a threshold value. If the comment's similarity score S for a collection is above the threshold, it is added to that collection. If it is above the threshold for multiple collections, it may be added to the collection for which it has the highest similarity score.

For this example, an arbitrary threshold value of 1 may be selected. This threshold value can be user defined. For C1 in this example, the similarity with collection A (1.675) exceeds the threshold value (i.e., 1.675>1), so C1 is therefore added to collection A. For C2 in this example, its similarities do not exceed the threshold for any of the collections (i.e., 0.375<1, 0.435<1, 0.465<1). C2 may therefore be used to form a new collection (collection "D") with an Activity score of 1.

Next, the semantic-uniqueness score is determined, based on three semantic similarity measures. Thus, the three semantic similarities are determined (i.e., steps 535, 540 and 545 of method 500).

First, semantic similarity between active collections for the live chat stream may be obtained at step 535 as follows:

$$(on \; Avs \; B/C/D) \rightarrow AVG(0,0,0) \rightarrow 0$$

$$(on \; Bvs \; A/C/D) \rightarrow AVG(0,0,0) \rightarrow 0$$

$$(on \; Cvs \; A/B/D) \rightarrow AVG(0,0,0) \rightarrow 0$$

$$(on \; Dvs \; A/B/C) \rightarrow AVG(0,0,0) \rightarrow 0$$

Second, the semantic similarity against non-active collections for the current live chat stream is determined at step 540. Non-active collections for the live chat stream may include, for example: F("what great content! Watch you every day") and G ("The key to winning is the soulblade"). The semantic similarity for each collection against the non-active collections is therefore:

$$(on \; Avs \; F/G) \rightarrow AVG(0, 0.17) \rightarrow 0.085$$

$$(on \; Bvs \; F/G) \rightarrow AVG(0.4, 0) \rightarrow 0.2$$

$$(on \; Cvs \; F/G) \rightarrow AVG(0,0) \rightarrow 0$$

$$(on \; Dvs \; F/G) \rightarrow AVG(0,0) \rightarrow 0$$

Third, the semantic similarity against all chat history not part of the current live chat session (i.e., against all "archived" chat history) can be determined at step 545 as follows:

$$(on\ Avs\ Archive)\to 0.1$$

$$(on\ Bvs\ Archive)\to 0.23$$

$$(on\ Cvs\ Archive)\to 0.15$$

$$(on\ Dvs\ Archive)\to 0.12$$

Based on the three semantic similarity measures determined according to steps 535, 540, and 545, a semantic-uniqueness score (U) can be calculated for each active collection at step 550 as follows:

$$U=W4*(1-Av)+W5*(1-Dv)+W6*(1-Hv)$$

wherein "Av" is the average semantic similarity between the collection and other active collections, W4 is a fourth weighting value, Dv is an average semantic similarity between the collection and other deactivated collections, W5 is a fifth weighting value, Hv is an average semantic similarity between the collection and historic collections, and W6 is a sixth weighting value.

As an example, for the sample collections described above, and assuming weighting values of W4=1, W5=0.75, and W6=0.5, the following uniqueness scores are obtained:

$$on(A)\to 1*(1-0)+0.75*(1-.0.085)+0.5(1-0.1)=1+0.68+0.45=2.13$$

$$on(B)\to 1*(1-0)+0.75*(1-0.2)+0.5(1-0.23)=1+0.6+0.385=1.985$$

$$on(C)\to 1*(1-0)+0.75*(1-0)+0.5(1-0.15)=1+1+0.425=2.425$$

$$on(D)\to 1*(1-0)+0.75*(1-0)+0.5(1-0.12)=1+1+0.44=2.44$$

Method 500 further comprises calculating an activity score for each collection at step 560. If a collection has had a new comment added, its activity score may increase asymptotically towards 1 (e.g., along a logarithmic or other exponential curve). If the collection has not had a new comment added, its activity score may decay/reduce towards 0. Accordingly, the activity score for each collection can be calculated as follows:

$$on(A)-(+1\ comments)\text{Stays at the max}(1)$$

$$on(B)-(+0\ comments)0.6\to 0.54$$

$$on(C)-(+0\ comments)0.8\to 0\ 0.76$$

$$on(D)-(+1\ comments)\text{Stays at the max}(1)$$

Method 500 further comprises determining the final importance score "I" for each collection at step 565. The final importance score may be determined based on the activity score and semantic-uniqueness score as follows:

$$I=W7*U+W8*Ac$$

wherein U is a semantic-uniqueness score, W7 is a seventh weighting value, Ac is the Activity Score, and W8 is an eighth weighting value.

Thus, for the collections of this example, and assuming weighting values W7=0.8 W8=1, final importance score I for each collection is as follows:

$$on(A)\to 0.75*2.13+1*1=2.59$$

$$on(B)\to 0.75*1.985+1*0.54=2.02$$

$$on(C)\to 0.75*2.425+1*0.76=2.57$$

$$on(D)\to 0.75*2.44+1*1=2.83$$

Based on the final importance scores, the display of each collection is controlled. For example, a system performing method 500 can compare the final importance scores to a threshold value at step 570 and, based on that comparison, select which collections to display and which collections to omit at step 575. In some instances, if the system has a large number of collections, the collections may be culled by low importance score. This can be accomplished in many different ways; for example, in some instances, collections associated with the lower 50% of importance scores may be culled. In some instances, only the top five collections (ranked by importance score) may be displayed (i.e., all other collections may be culled), etc. In this way, the collections may be displayed in the live chat stream, with their importance score determining their relative impact on the screen.

From the above example, it can be seen that:

Collection A had useful information. Multiple comments went into it, resulting in relatively low semantic-uniqueness, but high activity kept its importance score high.

Collection B was a low-effort comment and not very unique. It had also been seen before in the past. Therefore, it was the most likely to be culled.

Collections C and D both have higher semantic-uniqueness as they contain new information or questions, so they may be displayed.

It is also noted that, in practice, embodiments may be configured to handle volumes of comments where live streams get hundreds of comments per minute. The example above has simply been provided to demonstrate what would happen with three initial collections and two new comments. Employed embodiments will be more impactful when working against a large amount of data.

The proposed live chat comment processing concept(s) may therefore provide numerous advantages over conventional live chat stream implementations. These advantages include, but are not limited to, optimized display of comments in a live chat stream. In embodiments of the present invention, this technical solution is built on semantic uniqueness and continuing user interaction.

In still further advantages to a technical problem, the systems and processes described herein provide a computer-implemented method for controlling the display of comments in a live chat stream, and such live chat streams may be provided on (or via) a distributed communication network. In this case, a computer infrastructure, such as the computer systems shown in FIGS. 1 and 4 or the cloud environment shown in FIG. 2 can be provided and one or more systems for performing the processes of the invention can be obtained (e.g., created, purchased, used, modified, etc.) and deployed to the computer infrastructure. To this extent, the deployment of a system can comprise one or more of:

(i) installing program code on a computing device, such as computer system shown in FIG. 1, from a computer-readable medium;

(ii) adding one or more computing devices to the computer infrastructure and more specifically the cloud environment; and (iii) incorporating and/or modifying one or more existing systems of the computer infrastructure to enable the computer infrastructure to perform the processes of the invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
receiving new comments provided to a current session of a live chat stream;
analyzing content of the new comments;
for each of the new comments, adding, based on the analyzing, the new comment to one or more of a plurality of collections of comments;
identifying active collections of the plurality of collections, active collections including at least one new comment;
calculating, for each active collection, a first measure of semantic similarity between the collection and the remaining active collections of the live chat stream;
calculating, for each active collection, a second measure of semantic similarity between the active collection and non-active collections of the live chat stream;
calculating, for each active collection, a third measure of semantic similarity between the active collection and historical collections of comments for one or more prior sessions of the live chat stream;
determining, for each active collection, a semantic-uniqueness score based on the first, second and third measures of semantic similarity;
determining, for each active collection, an activity score representing an activity level of the active collection for the current session of the live chat stream;
determining, for each active collection, a final importance score based on its semantic-uniqueness score and activity score; and
controlling the display of each active collection based on its final importance score.

2. The method of claim 1, wherein the determining a semantic-uniqueness score based on its first, second and third measures of semantic similarity includes applying weighting values to the first, second and third measures of semantic similarity.

3. The method of claim 1, wherein the activity score is determined based on a temporally decaying value.

4. The method of claim 3, wherein the determining an activity score for an active collection comprises:
increasing a previous activity score for the active collection responsive to a new comment being added to the active collection; and
decreasing a previous activity score for the active collection responsive to no new comment being added to the active collection within a pre-determined period of time.

5. The method of claim 1, wherein analyzing content of a new comment provided to the current session of the live chat stream comprises:
identifying one or more concepts of the new comment;
determining a distance of the new comment from the active collections of comments; and
extracting one or more key words from the new comment.

6. The method of claim 5, wherein identifying one or more concepts of the new comment includes processing the new comment with a concept mining algorithm.

7. The method of claim 5, wherein the determining a distance of the new comment from the active collections of comments includes calculating a Levenshtein distance of the new comment from each of the active collections of comments.

8. The method of claim 5, wherein the analyzing content of the new comment provided to the current session of the live chat stream further includes:
calculating, for each active collection, a similarity score of the new comment based on:
the identified one or more concepts of the new comment;
the determined distance of the new comment from the active collections of comments; and
one or more extracted keywords from the new comment; and
wherein adding the new comment to one or more of the collections of comments based on a result of the analysis includes adding, for each active collection, the new comment to the active collection if the calculated similarity score of the new comment for the active collection exceeds a threshold value.

9. The method of claim 1, wherein the controlling the display of an active collection based on its final importance score includes displaying the active collection if its final importance score exceeds a predetermined value.

10. A system, comprising:
a memory; and
a processor coupled to the memory, the processor configured to:
receive new comments provided to a current session of a live chat stream;
analyze content of the new comments;
for each of the new comments, add, based on the analyzing, the new comment to one or more of a plurality of collections of comments;
identify active collections of the plurality of collections, active collections including at least one new comment;
calculate, for each active collection, a first measure of semantic similarity between the collection and the remaining active collections of the live chat stream;
calculate, for each active collection, a second measure of semantic similarity between the active collection and non-active collections of the live chat stream;
calculate, for each active collection, a third measure of semantic similarity between the active collection and historical collections of comments for one or more prior sessions of the live chat stream;
determine, for each active collection, a semantic-uniqueness score based on the first, second and third measures of semantic similarity;
determine, for each active collection, an activity score representing an activity level of the active collection for the current session of the live chat stream;
determine, for each active collection, a final importance score based on its semantic-uniqueness score and activity score; and
control the display of each active collection based on its final importance score.

11. The system of claim 10, wherein the determining a semantic-uniqueness score based on its first, second and third measures of semantic similarity includes applying weighting values to the first, second and third measures of semantic similarity.

12. The system of claim 10, wherein the activity score is determined based on a temporally decaying value.

13. The system of claim 12, wherein the determining an activity score for an active collection comprises:
   increasing a previous activity score for the active collection responsive to a new comment being added to the active collection; and
   decreasing a previous activity score for the active collection responsive to no new comment being added to the active collection within a pre-determined period of time.

14. The system of claim 10, wherein analyzing content of a new comment provided to the current session of the live chat stream comprises:
   identifying one or more concepts of the new comment;
   determining a distance of the new comment from the active collections of comments; and
   extracting one or more key words from the new comment.

15. The system of claim 14, wherein identifying one or more concepts of the new comment includes processing the new comment with a concept mining algorithm.

16. The system of claim 15, wherein the determining a distance of the new comment from the active collections of comments includes calculating a Levenshtein distance of the new comment from each of the active collections of comments.

17. The system of claim 16, wherein the analyzing content of the new comment provided to the current session of the live chat stream further includes:
   calculating, for each active collection, a similarity score of the new comment based on:
      the identified one or more concepts of the new comment;
      the determined distance of the new comment from the active collections of comments; and
      one or more extracted keywords from the new comment; and
   wherein adding the new comment to one or more of the collections of comments based on a result of the analysis includes adding, for each active collection, the new comment to the active collection if the calculated similarity score of the new comment for the active collection exceeds a threshold value.

18. The system of claim 13, wherein the controlling the display of an active collection based on its final importance score includes displaying the active collection if its final importance score exceeds a predetermined value.

19. A computer program product, the computer program product comprising a computer readable storage medium having program instructions embodied therewith, the program instructions executable by a computer to cause the computer to:
   receive new comments provided to a current session of a live chat stream;
   analyze content of the new comments;
   for each of the new comments, add, based on the analyzing, the new comment to one or more of a plurality of collections of comments;
   identify active collections of the plurality of collections, active collections including at least one new comment;
   calculate, for each active collection, a first measure of semantic similarity between the collection and the remaining active collections of the live chat stream;
   calculate, for each active collection, a second measure of semantic similarity between the active collection and non-active collections of the live chat stream;
   calculate, for each active collection, a third measure of semantic similarity between the active collection and historical collections of comments for one or more prior sessions of the live chat stream;
   determine, for each active collection, a semantic-uniqueness score based on the first, second and third measures of semantic similarity;
   determine, for each active collection, an activity score representing an activity level of the active collection for the current session of the live chat stream;
   determine, for each active collection, a final importance score based on its semantic-uniqueness score and activity score; and
   control the display of each active collection based on its final importance score.

20. The computer program product of claim 19, wherein the determining a semantic-uniqueness score based on its first, second and third measures of semantic similarity includes applying weighting values to the first, second and third measures of semantic similarity.

* * * * *